United States Patent
Craun et al.

(10) Patent No.: US 6,646,085 B1
(45) Date of Patent: Nov. 11, 2003

(54) STYRENATED MALEINIZED FATTY ACID GLYCERIDE COPOLYMER FOR AQUEOUS DISPERSED BINDERS IN SOLVENT FREE AMBIENT DRY PAINTS

(75) Inventors: Gary P. Craun, Berea, OH (US); Kenneth G. Hahn, Hinckley, OH (US); George P. Rosekelly, Norwalk, OH (US)

(73) Assignee: The Glidden Company, Cleveland, OH (US)

( * ) Notice: Subject to any disclaimer, the term of this patent is extended or adjusted under 35 U.S.C. 154(b) by 236 days.

(21) Appl. No.: 09/665,024

(22) Filed: Sep. 19, 2000

(51) Int. Cl.$^7$ .......................... C08F 120/68; C08L 33/04
(52) U.S. Cl. ...................... 526/318; 526/335; 524/514; 524/556; 524/564
(58) Field of Search ................................. 524/507, 508, 524/513, 514, 556, 563, 564; 528/502; 522/503; 526/318, 335

(56) References Cited

U.S. PATENT DOCUMENTS 3,030,321 A    4/1962   Lombardi et al.
5,470,906 A   11/1995   Craun et al.

FOREIGN PATENT DOCUMENTS

EP   0 707 110 A1 *   4/1995
EP   0 707 110         4/1996
GB   1100347          1/1968

* cited by examiner

*Primary Examiner*—Robert Harlan
(74) *Attorney, Agent, or Firm*—Kenneth J. Stachel

(57) ABSTRACT

An ambient dry water dispersed coating composition substantially free of volatile organic coalescing solvents, the coating composition containing a polymer film forming binder comprises between 40% and 50% copolymerized non-conjugated, unsaturated fatty acid triglyceride, between 40% and 55% copolymerized ethylenic monomer including styrene, and between 3% and 12% copolymerized maleic anhydride. The film forming copolymer is produced by first reacting maleic anhydride with the fatty acid triglyceride at high temperatures between 140° C. to form a maleinized triglyceride having a pendent maleic anhydride structure. The maleinized triglyceride is then styrenated at temperatures between about 80° C. and 200° C. in the presence of at least 4% peroxide initiator based on the weight of monomers copolymerized to form a styrenated, maleinized fatty acid triglyceride copolymer having anhydride groups. The anhydride groups are neutralized with amine or ammonia and the neutralized copolymer is dispersed in water.

9 Claims, No Drawings

STYRENATED MALEINIZED FATTY ACID GLYCERIDE COPOLYMER FOR AQUEOUS DISPERSED BINDERS IN SOLVENT FREE AMBIENT DRY PAINTS

This invention pertains to air dry, aqueous dispersed copolymer binders free of organic solvent useful in decorative and protective coatings. The binder copolymer comprises a fatty acid glyceride, typically triglycerides contained in vegetable oil, where the fatty acid chains are maleinized and then copolymerized with styrene and, optionally, other ethylenic monomers to provide a copolymer. The resulting copolymer is dispersed into water to provide a stable polymeric emulsion suitable for use as a polymeric binder for ambient dry paints.

BACKGROUND OF THE INVENTION

Paint coatings are surface protective coatings applied to substrates and dried to form continuous films for decorative purposes as well as to protect the substrate. Consumer paint coatings are air-drying aqueous coatings applied primarily to architectural interior or exterior surfaces, where the coatings are sufficiently fluid to flow out, form a continuous paint film and dry at ambient temperatures to protect the substrate surface. Industrial maintenance coatings are similar coatings applied to substrates in industrial environments to primarily protect the substrate.

An aqueous based paint coating ordinarily comprises an organic polymeric binder, pigments, water, thickeners, and various paint additives. In dried paint films, the polymeric binder functions as a binder for the pigments and provides adhesion of the dried paint film to the substrate. The pigments may be organic or inorganic and functionally contribute to opacity and color in addition to durability and hardness of the dried paint film. Some paint coatings contain little or no opacifying pigments and are described as clear coatings. The manufacture of paint coatings involves the preparation of polymeric binder, mixing component materials, grinding or dispersion of pigments in a dispersant medium, and thinning to commercial standards.

The polymeric binders used in paints typically are prepared by emulsion polymerization of ethylenic monomers and are referred to as latex polymer emulsions, and the resulting paints are referred to as latex paints. Development of an emulsion polymer represents a compromise where the polymer, when formulated with pigments and fillers, must be sufficiently hard at room temperature to give reasonable mechanical and chemical resistance, while being sufficiently soft for good film formation, even at non-ideal application temperatures approaching the freezing point of water. This is conventionally accomplished by designing a latex polymer with a moderately elevated Tg (glass transition temperature) but then lowering the Tg temporarily with a volatile organic coalescing solvent. The hardness of the latex polymer must be balanced to permit drying and film formation at low application temperatures, which requires soft polymer units, while at the same time being hard enough to provide dried film resistance properties, which requires hard polymer units. This is conventionally accomplished by designing a latex polymer with a moderately elevated Tg (glass transition temperature) but then lowering the Tg temporarily with a volatile organic coalescing solvent. Coalescing solvents function to externally and temporarily plasticize the latex polymer for time sufficient to develop film formation, but then diffuse out of the coalesced film after film formation. Volatilization of the coalescent permits film formation and subsequent development of the desired film hardness, but unfortunately contributes considerably to VOC's (volatile organic compounds) and is a significant source of residual odor, both of which are detriments in consumer air dry paints. A typical latex paint binder for instance contains copolymer consisting of major amounts of polymerized vinyl acetate, which contributes to polymer hardness, copolymerized with lesser amounts of acrylate monomer such as butyl acrylate, which contributes to polymer softening, along with volatile coalescent. Stabilization of the latex particles is accomplished through the use of anionic or nonionic surfactants which may or may not be polymerizable.

The prior art relating to copolymers of maleinized vegetable oils discloses copolymerization with various ethylenic monomer followed by emulsification of the resulting copolymer in water. U.K. patent specification No. 1,100,347 for instance discloses a water dilutable maleic modified styrenated oil for surface coatings based on utilizing a water miscible solvent for dispersing the modified oil into water, where the dispersed coating conventionally air dries with the assistance of metallic dryers. This process however produces a mixture of inadequately copolymerized components having high levels of non-copolymerized components which cannot be dispersed into water without a water miscible cosolvent, while film forming is by air drying oxidation of oils promoted by cobalt dryers to oxidize double bonds in the oil fatty acid chains. In essence, the prior art does not solve inherent compatibility problems of the multiple components copolymerized in a styrenated maleinized oil to obtain high levels of copolymerization and a resulting uniform copolymer readily dispersible into water without volatile organic cosolvents. It has been found that an insufficient level of oil copolymerized into the copolymer will generate a non-homogeneous film where free oil is incompatible with polystyrene causing phase separation, a hazy film with poor film integrity properties, and consequently an unacceptable protective coating or paint. A further inherent problem pertains to insufficient oil being copolymerized in the copolymer which in turn produces insufficient film formation flexibility and attendant film brittleness. The ability of a copolymer to form a film at ambient temperatures is dependent on achieving an acceptable range of film forming copolymer flexibility at ambient use temperatures. This generally is referred to in polymer technology as the glass transition temperature, Tg. Styrenated, maleinized oil copolymers invariably however exhibit a sharp temperature transition comparable to pure copolymer systems due to the diverse range of individual polymer structures in the copolymer. In order to obtain an acceptable air-dry decorative coatings, an acceptable range of copolymer flexibility at use temperatures must be inherent and characteristic of a copolymer. A further problem in achieving an acceptable paint product is reduction of free monomer to exceptionally low levels acceptable for a decorative coating product to avoid disagreeable odors and related health problems. Naturally occurring antioxidants present in vegetable oils, along with low reactivity of certain types of double bonds in vegetable oil, retard and inhibit free radical polymerizations making monomer conversion difficult thus leaving high final free monomer levels. Residual free monomer is an important concern in consumer paints.

It now has been found that low cost polymeric binders for air dry paints, particularly interior decorative architectural paints, including primers, can be synthesized from maleinized fatty acid glycerides, such as triglycerides in vegetable oils, and overpolymerized with styrene in the absence of organic solvent to produce a copolymer binder. The copolymer can be treated with amine or ammonium hydroxide to produce a carboxyl functional copolymer which can be dispersed into water to form an aqueous dispersed copolymer particularly useful for air dry paint coatings without the need for metallic dryers. The dried paint films are clear films which exhibit good hardness and flexibility, good water resistance, along with good wet adhesion properties. The copolymer binder substantially reduces or essentially eliminates conventional hydroxyethylcellulose thickeners, an expensive thickener material, while preferred low cost acrylic thickeners are particularly effective with the copolymers of this invention. The copolymers of this invention can be processed without volatile organic solvents while the paint coatings produced are essentially VOC free. Close to 50% by weight of the copolymer comprises renewable vegetable oils as opposed to non-renewable petrochemicals.

In accordance with this invention, sufficient copolymerization of the oil into the copolymer can be achieved to yield a clear, dried resilient film indicating the various components are sufficiently copolymerized. An important aspect of this invention is to considerably increase the level of fatty acid glyceride oil copolymerized into the resulting copolymer to produce a polymeric film which remains clear and avoids phase separation over time. The copolymer is sufficiently plasticized by oil copolymerized into the copolymer to be capable of low temperature film formation. Copolymer binders can be produced for decorative coatings without the use of coalescent solvents, a primary contributor to VOC level. The copolymer binder becomes film forming when applied at or above 40° F. without the need for coalescing solvent. By the appropriate selection of initiator type and amount, very low free monomer levels required for decorative coatings can be obtained. An other unanticipated advantage of this invention is the excellent thickener response of the paint formulated due to the low quantities of thickener required to achieve desired paint viscosity. An additional advantage is that low volume solids paints, relative to conventional paints, can be formulated at desired paint viscosity with conventional levels of various paint thickeners. Conventional metallic dryers such as cobalt naphthenate are not required nor desired. These and other advantages of this invention will become more apparent by referring to the detailed description and the illustrative examples.

SUMMARY OF THE INVENTION

Briefly, the invention pertains to ambient dry paints containing a copolymer binder based on maleinized non-conjugated unsaturated fatty acid glycerides overpolymerized with styrene in absence of volatile organic solvent to produce a copolymer followed by dispersion of the copolymer into water to form a water dispersed copolymer. Preferred glycerides are triglycerides. The maleinized fatty acid triglyceride is formed by reacting maleic anhydride at high temperatures to preferentially form a maleic anhydride structure pendently attached to the fatty acid chain on the triglyceride. The maleinized fatty acid triglycerides are copolymerized with styrene along with a minor amount of other ethylenic monomers, if desired, in the presence of free radical initiators and in the absence of solvents and water. The resulting copolymer is a styrenated malenized fatty acid triglyceride copolymer. The copolymer is reacted with water or alcohol to open the anhydride and form carboxyl groups which can be neutralized with amine or ammonium hydroxide, and then dispersed into water. The copolymer preferably comprises by weight 40% to 50% copolymerized fatty acid triglyceride, 40% to 55% copolymerized monomer including styrene, with the balance being 3% to 12% copolymerized maleic anhydride. The most preferred composition comprises between 42% and 48% copolymerized fatty acid triglyceride oil, between 42% and 52% copolymerized styrene and other ethylenic monomers, with the balance being 6% to 10% copolymerized maleic anhydride.

In accordance with the process of this invention, non-conjugated unsaturated fatty acid glyceride oil is first maleinized at high temperatures to form a maleinized fatty acid glyceride, which is then overpolymerized with styrene and lesser minor amounts of other ethylenic monomers if desired. The styrene polymerization step is at high temperatures and high initiator levels, in absence of water and volatile organic solvents, to form a styrenated maleinized modified fatty acid glyceride copolymer. The copolymer is reacted with water or alcohol to open the anhydride and form carboxyl functionality. The resulting carboxyl functional copolymer can be dispersed into water with amine neutralization of the carboxyl groups to form a water dispersed copolymer suitable for use as polymeric binder for aqueous dispersed air dry paints.

DETAILED DESCRIPTION OF THE INVENTION

The polymeric copolymer of this invention is based on malenization of unsaturated fatty acid glyceride, preferably triglyceride vegetable oil, overpolymerized with styrene to form a water dispersible copolymer.

Vegetable oils contain primarily triglycerides which are triesters of glycerol and fatty acids with varying degrees of unsaturation. Preferred unsaturated fatty acid triglycerides, are esters of glycerol and fatty acid having an alkyl chain of 12 to 24 carbon atoms with at least two non-conjugated double bonds. The fatty acid glycerides are triglycerides in unsaturated glyceride oils generally referred to as drying oils or semidrying oils. Typical drying oils include linseed oil and perilla oil, while typical semidrying oils include tall oil, soybean oil, and safflower oil. Useful triglyceride oils can have identical fatty acid chains or alternatively can contain different fatty acid chains attached to the same glycerol molecule. Preferred oils have fatty acid chains containing non-conjugated double bonds. Single double bond or conjugated double bond fatty acid chains can be used in minor amounts. Double bond unsaturation in glycerides is conventionally measured by iodine value (number) which indicates the degree of double bond unsaturation in the fatty acid chains. Sufficient double bond unsaturation in the fatty acid chains is necessary to allow maleinization at a level sufficient to subsequently enable the glyceride adduct dispersible in water. Unsaturated fatty acid glycerides oil useful in this invention have an iodine value greater than 50 and preferably between 100 and 210.

Naturally occurring triglycerides in vegetable oils ordinarily are not pure compounds but instead are mixtures of fatty acid chains present as glycerides and comprises a distribution of fatty acid esters of glyceride, where the fatty acid distribution may be random but within an established range that may vary moderately depending on growing conditions of the vegetable source. Soybean oil for instance comprises approximately about 11% palmitic, 4% stearic, 25% oleic, 51% linolenic, and 9% linoleic fatty acids, where oleic, linoleic and linolenic are unsaturated fatty acids. Useful unsaturated vegetable oils are those glyceride oils containing considerable amounts of non-conjugated unsaturated fatty acid glyceride esters such as linoleic and linolenic fatty acids. Commercial and useful unsaturated glyceride oils include corn oil, cottonseed oil, grapeseed oil, hempseed oil, linseed oil, wild mustard oil, peanut oil, perilla oil, poppyseed oil, rapeseed oil, safflower oil, sesame oil, soybean oil, sunflower oil, and tall oil.

Particularly preferred fatty acid glycerides contain considerable amounts of linoleic and linolenic fatty acid chains and include oils such as hempseed oil, linseed oil, perilla oil, poppyseed oil, safflower oil, soybean oil, sunflower oil and tall oil, as well as grapeseed, rattonseed and corn oils, and similar oils which contain high levels of linoleic and linolenic fatty acid glyceride. At least 50%, and preferably between 75% and 100% by weight of the preferred oils are utilized based on the weight of vegetable oil copolymerized along with minor amounts of less preferred lower unsaturated fatty acid glyceride oils. The preferred oils contain predominantly linoleic and linolenic fatty acid glycerides. The preferred oil is soybean oil. The copolymers of this invention contain between about 40% and 50% copolymerized fatty acid glyceride oils. Below about 40% results in brittle dried paint films while above about 50% results in soft paint films. Preferred triglyceride levels are between 42% and 48% by weight of the resulting copolymer. Oils not containing considerable amounts of linoleic or linolenic fatty acid glycerides, such as palm oil, are not workable and cause incompatible resin mixtures when styrenated. However, minor amounts of such oils or saturated oils can be used, if desired, to control copolymerization with maleic anhydride and ethyenic monomer.

In accordance with this invention, the non-conjugated, unsaturated fatty acid esters of glyceride are maleinized with maleic anhydride at high temperatures to form a pendant maleinized structure attached to fatty acid glyceride. The malenization reaction of this invention is between the maleic double bond carbon atom and a non-conjugated double bond carbon in the fatty acid chain of the glyceride oil to provide an -ene synthesis reaction and connection by hydrogen abstraction between the maleic anhydride anhydride structure attached to and depending from a carbon atom in the fatty acid chain while avoiding a Diels Alder adduct. The -ene synthesis causes migration of the double bond in the fatty acid chain to become a conjugated double bond structure fatty acid chain, while the maleic double bond carbon attaches to the former non-conjugated double bond carbon, which now becomes a single bond carbon adjacent to the newly formed conjugated double bond in the fatty acid chain in the resulting maleinized fatty acid structure. For example, the -ene reaction can be characterized as a concerted six-member cyclic double bond carbon in maleic anhydride, while a partial bond forms between the other double bond carbon and the fatty acid carbon beta to the activated methylene with migration of the double bond in the fatty acid chain toward the activated methylene to yield a conjugated double bond structure in a fatty acid chain. This conjugation formation is believed to stabilize the copolymer. Although minor amounts of side reactions may occur, such as formation of a Diels Alder adduct, the resulting pendant connection of the former double bond carbon of the maleic anhydride structure predominates due to controlling the high temperature and other processing parameters in the maleinization step. While it is possible that subsequent reaction of another maleic anhydride molecule with the newly formed conjugated double bonds may be a Diels-Alder reaction, the high reaction temperature of this invention causes significant decomposition thus minimizing the Diels-Alder reaction. Hence, with time, almost all of the maleic anhydride is eventually consumed in the -ene reaction, so long as sufficient non-conjugated fatty acid chain exists. The presence of non-conjugated double bonds in the linoleic and linolenic fatty acid chains promotes the -ene synthesis reaction, which in turn promotes a stable conjugated double bond structure in the fatty acid chains. To achieve this -ene reaction along with hydrogen abstraction interconnection between the maleic double bond carbon and the former non-conjugated double bond carbon, the maleic anhydride and fatty acid glycerides are heated at temperatures above 140° C. to avoid a Diel Alder reaction, broadly between 150° C. and 275° C., and preferably between about 200° C. and 250° C., where lower temperatures are used initially followed by increasing quickly to higher heating temperatures. Typically, the fatty acid triglyceride is held at 1 00C. to 170° C. while the maleic anhydride is added, and then the reaction temperature raised to higher temperatures. The higher reaction temperatures promote the -ene reaction described while suppressing the Diels Alder adduct formation. Conjugated double bond fatty acid chains are not suitable for maleinization since Diels Adler's adduct formation predominates. The weight ratio of maleic anhydride to oil is greater than 0.05:1, preferably between about 0.16:1 and 0.2:1, while the molar ratio is between about 1.78:1 and 1.42:1, with a preferred molar ratio of about 1.5:1 to 1.55:1. On the basis of fatty acid content of linoleic and linolenic fatty acid chains in the oil, the molar ratio of maleic anhydride to said fatty acid chains is between about 1:1 to 0.8:1 and preferably between 0.82:1 and 0.88:1, which essentially provides sufficient linoleic and linolenic fatty acids to completely react with available maleic anhydride. Oleic acid can be maleinized to a minor extent but at a significantly slower rate compared to linoleic and linolenic fatty acids. The presence of linoleic and linolenic fatty acid chains in the oil containing non-conjugated double bonds, seems to particularly promote the -ene hydrogen extraction formation to attach the double bond carbon of the maleic anhydride in a depending maleic anhydride structure to the fatty acid chain in the manner described above. On a weight basis, the weight ratio of maleic anhydride to fatty acid glyceride oil is between 13% and 18% maleic anhydride, preferably betweeen 13.8% and 16.7% and optimally between 14.5% and 15.1% maleic anhydride, with the remainder being oil depending on the vegetable oil used.

The maleinized fatty acid glyceride is further co-reacted with a styrenic monomer by in situ copolymerization in the absence of water and organic solvent. Useful styrenes include styrene, methyl styrene, lower alkyl styrenes, and vinyl toluene. Styrene is the preferred styrene monomer. Other ethyenically unsaturated monomers can be copolymerized if desired in minor amounts and include acrylic, methacrylic, and vinyl monomer. Useful acrylates and methacrylates monomers include lower alkyl esters of acrylic and methacrylic acid, such as methyl, ethyl, propyl, butyl, 2-ethyl hexyl, decyl, and similar aliphatic acrylates and methacrylates. Useful vinyl monomers include lower alkyl vinyl and vinyl ethers and esters. The monomers comprise at least 6% by weight styrenic monomer, preferably above 20%, and more preferably between 50% and 100% styrenic monomer, where styrene is preferred. Acrylic or methacrylic acid are not useful and should be avoided.

In situ copolymerization of the styrene and other ethylenic monomers is activated by peroxide initiator or other free radical initiator at polymerization temperatures typically from about 80° C. to 200° C. but preferably at higher temperatures between 135° C. and 160° C. Useful levels of initiator are above 4%, and preferably from about 4% to 10% initiator by weight based on the weight of ethylenic monomers copolymerized, where higher levels of initiator are preferred to increase the percentage of copolymerization between the fatty acid glycerides and styrene monomers. On a molar equivalent peroxide basis, the peroxide initiator used should be at a level above the molar peroxide equivalent of 4% by weight di-tertiary butyl peroxide based on the weight of monomers copolymerized. The most preferred initiator level is between 4% and 8% based on the weight of monomers copolymerized to assure high levels of ethylenic monomer copolymerized with maleinized oil to form an integral copolymer thus minimizing free non-polymerized components and partially copolymerized components. Initiator levels below 4% reduces oil incorporation into the copolymer and causes phase separation in the polymeric resin mixture. Accordingly, by using preferred levels of initiator, well above 70% by weight of the available oil becomes integral with the copolymer, which corresponds to about 85% of the resulting copolymer. The remaining oil may appear as free unpolymerized oil or maleinized oil, along with the minimal amounts of homopolystyrene, but at insufficient accumulative levels to cause incompatibility with the resulting copolymer. When free unpolymerized oil or emaleinized oil exceeds about 20% of the percentage of the fatty acid triglyceride co-reacted, dried paint film clarity decreases considerably resulting in poor paint film formation due to incompatibility of non-compolymerized oil with the copolymer and other components.

Useful peroxide initiators include for instance benzoyl peroxide, t-butyl hydroperoxide, tertiary butyl perbenzoate, cumene peroxide and similar peroxide polymerization initiators. Preferred peroxides are dialkyl peroxides and the most preferred peroxide is di-tert-butyl-peroxide. The styrene and other ethylenic monomers copolymerize by addition polymerization through the monomer double bonds with available conjugated double bonds in the fatty acid chains and residual maleic double bonds if any. Radical sites on the fatty acid chains increase when initiator level is higher and reaction temperature is higher. For instance, initiator levels of about 8% convert about 85% or more of the available fatty acid glyceride into resulting copolymer. The resulting copolymer comprises by weight between 40% and 50% copolymerized fatty acid triglyceride, between 40% and 55% copolymerized monomer, with the balance being 3% to 12% copolymerize maleic anhydride. Preferred compositions comprise between 42% and 48% copolymerized fatty acid glyceride, between 42% and 52% copolymerized styrene and other ethylenic monomers, with the balance being between 6% and 10% copolymerized maleic anhydride. Increased initiator levels also increases molecular weights of the resulting copolymers, a response contrary to expectations ordinarily found in free radical polymerizations. Increased molecular weight indicates efficient copolymer build-up where most of the copolymerizing components are indeed copolymerized as terpolymer in the resulting copolymer. The molecular weight increases with increased levels of copolymerized monomer, that is, molecular weight increases by increasing the styrene to oil ratio. The monomer copolymerizes with conjugated double bonds formed during the maleinization step of linoleic and linolenic fatty acids in the triglyceride oils. Copolymer weight average molecular weight is between 10,000 and 100,000, and higher, while preferred molecular weight are between 20,000 and 60,000 (GPC).

In accordance with this invention, the maleinized anhydride group is maintained during the monomer polymerization step and is opened subsequently by reaction with water or low alkyl alcohol to produce carboxyl groups to render the addition copolymer of maleinized glyceride water dispersible. The anhydride structure is opened with water at about 50 to 120° C. The reaction of the anhydride with an alcohol considerably improves water resistance. Stoichiometric ratios of water or alcohol relative to the anhydride are preferred, although lesser or greater amounts can be used. In a preferred aspect of this invention, the maleic adduct is reacted in the absence of water and volatile organic solvent with an organic monoalcohol, preferably a lower alkyl alcohol such as methyl, ethyl or a propyl alcohol, or a secondary or tertiary alcohols such as isopropanol, t-butanol and similar branced alcohols, to produce an alkyl ester group and a carboxyl functional group. Secondary and tertiary alcohols are preferred and provide greater hydrolytic stability than primary alcohols. The reaction with alcohol can be at temperatures between 50° C. and 120° C.

The carboxyl functional maleinized oil addition copolyer can be dispersed into water by partially or completely neutralizing the carboxyl groups with base such as ammonium hydroxide. Ammonia is the most preferred neutralizing base. Useful amines include monoethanol amine, dimethyl ethanol amine, diethanol amine, triethyl amine, dimethylaniline and similar primary, secondary and teriary amines. Neutralization levels of 50% to 200% based on available carboxyl functionally are useful, while 80% to 120% neutralization levels are preferred. Inversion into water can be achieved by adding the aminated carboxyl copolymer directly to water, or inversely by adding water to the aminated carboxyl copolymer. The ammonium salt of carboxyl functional maleinized copolymer can be dispersed into water without assistance from surfactants and with low shear mixing to provide a stable aqueous dispersion containing preferably from about 40% to 80% by weight water.

The styrenic monomers copolymerized with maleinized oil provide the desired film hardness along with low temperature film formation sufficient for room temperature film formation. Soft low Tg monomers or acrylic or methacrylic acids are not required since the maleinized triglyceride component provides both water disperability and low film forming Tg. The resulting copolymer exhibits good film formation at 40° F. without coalescing solvents.

In preferred aspects of the invention, free styrene reduction below 0.1% residual monomer can be achieved by staging initiator additions while polymerizing the monomers in conjunction with maintaining viscosity control. In consumer paints, residual free monomer is very important to avoid disagreeable odor and possible health problems along with zero VOC. The initiator, preferably di-tert-butyl-peroxide, can be utilized to promote the high levels of copolymerization of oil incorporated into the completed copolymer development, while a secondary initiator can be used to assure essentially complete polymerization of residual monomer, especially styrene. Useful secondary initiators include dicumyl peroxide, t-butyl perbenzoate, t-butyl peroctate, and benzolyl peroxide. Dialkyl peroxides are preferred secondary initiators. Preferred viscosity levels of the copolymer are between 100 and 140 centipoise (cPs) at 100° C. The preferred procedure is to utilize 5% to 20% of the total initiator in the beginning of the monomer polymerization step. By charging the initiator in the beginning of the monomer polymerization step, styrene conversion begins earlier and late end hold is reduced thereby providing improved viscosity control at the end of the polymerization step, and further providing essentially complete monomer conversion along with desirable viscosity control of the copolymer.

In accordance with the preferred process of this invention, the fatty acid ester of glyceride oil, preferably a vegetable oil containing linoleic acid and linolenic acid chains, such as soybean oil, is first sparged with nitrogen by heating the oil with about 0.3 to 0.4% triphenyl phosphite at elevated temperatures above 150° C., and preferably between about 175° C. and 220° C., and held for about one-half to one hour. The nitrogen sparge removes dissolved oxygen and water from the oil, where the triphenyl phosphite minimizes yellowing during the subsequent copolymer synthesis process steps.

The oil is then maleinized with small amounts of maleic anhydride under conditions to promote the -ene synthesis product of the maleic double bond carbon with a double bond carbon in a fatty acid ester of triglyceride. The maleinization occurs primarily with linoleic and linolenic fatty acids when sufficiently present to produce a pendant maleic group, and in turn causes subsequent conjugation of the unsaturation in these fatty acids and provides thermodynamic stability to the resulting copolymer. Small amounts of maleic anhydride are reacted under conditions to promote hydrogen abstraction and a depending structural connection of the maleic double bond carbon with a non-conjugated double bond carbon in fatty acid ester of glyceride. The hydrogen extraction and addition of the maleic structure causes the fatty acid chain to become conjugated, which in turn provides polymeric stability and assists thermodynamically to promote subsequent monomer copolymerization. Conjugation of double bonds during maleinization advantageously facilitates subsequent monomer copolymerization with conjugated double bonds to incorporate maleinized oil in the copolymer. The reaction temperature is lowered to about 150° C. while adding maleic anhydride to the reactor, but then up heated to above 200° C. and held at about 200° C. to about 235° C. until completion, generally one hour or so depending on the volume of reactants. Styrene along with optional minor amounts of other ethylenic monomers are then copolymerized in situ with the maleinized oil to form a copolymer. The copolymer can be dispersed into water as previously described.

An aqueous dispersed air dry paint coating can be produced by combining the resulting polymeric binder of this invention with pigments and other paint additives in a pigment dispersing mill such as a Cowles dispenser. A pigment dispersion can be first produced in a conventional pigment grinding mill and then combined under moderate or low shear with the polymeric binder and other paint additives as desired. Useful mineral pigments include opacifying pigments such as titanium dioxide, zinc oxide, titanium calcium as well as tinting pigments such as carbon black, yellow oxides, brown oxides, red oxides, raw and burnt sienna or umber, chromium oxide green, cadmium pigments and the like. Filler pigments such as clay, silica, talc, mica, wollastonite, wood flower, barium sulfate, calcium carbonate and similar mineral fillers can be added as desired. These pigments are typically dispersed in water with thickeners, dispersants, surfactants, biocidal agents, and defoamer. The grind base thus produced is then added to a mixture of water, the copolymer emulsion described here, optional conventional latex, thickener, surfactant, ammonium hydroxide or amine, defoamer, and optional coalescing solvent. Oxidative cure catalysts such as cobalt naphthenate can be added to assist in the air dry cure at a desirable minimum film forming temperature sufficient for ambient temperature application. The resulting air dried paint films exhibit good hardness, good clarity, and good wet adhesion properties.

The merits of this invention are further supported by the following examples.

EXAMPLE 1

A maleinized soya oil copolymerized with styrene was prepared as follows. The resulting copolymer comprises 45% soya oil, 8% maleic anhydride, and 47% styrene. Di-tert-butyl peroxide is at 8% based on styrene.

| | | |
|---|---|---|
| A) | Soya oil | 675.0 g |
| | Triphenyl phosphite | 2.24 |
| B) | Maleic Anhydride | 120.0 |
| C) | Styrene | 705.0 |
| | Di-tert-butyl peroxide | 56.4 |
| D) | Ammonium hydroxide (29%) | 148.6 |
| | De-ionized water | 313.5 |
| E) | Non-ionic surfactant | 112.5 |
| F) | De-ionized water | 1877.1 |

Procedure:

Charge group A to a 5 L round bottom flask, equipped with an agitator, nitrogen sparge, and thermometer, leaving one joint open for exhaust without condenser. Heat with heating mantle to 200° C. and hold for one hour. Then cool to 150° C. and add group B and use Vigreaux column for exhaust, heat to 212° C. and hold for 30 minutes. Then heat to 225° C. and hold for one hour. Then cool to 150° C., replace Vigreaux column with condenser, and begin feeding group C over a 2 hour period. Following end of feed, hold at 150° C. for 90 minutes. Cool and hold at 80 to 95° C. and replace thermometer with thermocouple. Begin adding group D over ca. 20 minutes. As mixing becomes difficult, add E and increase agitation. Once group D is in, begin adding group F. Allow to cool to room temperature with agitation. Resin properties of the resulting maleinized styrenated soya oil copolymer are listed in Table 1.

TABLE 1

| N.V.M | 40% |
|---|---|
| pH | 8.8 |
| Viscosity (Brookfield) | 5000 cPs @ 80° F. |

EXAMPLE 2

A ca. 198 gallon batch of maleinized soya oil copolymerized with styrene to form a copolymer emulsified with aqueous base was prepared as follows.

| GROUP | NAME OF RAW MATERIAL | POUNDS | GRAMS |
|---|---|---|---|
| A | Alkali refined soya oil | 271.4 | |
| A | Triphenyl phosphite, GE Weston | | 408.2 |
| B | Maleic Anhydride | 46.44 | |
| C | Di-t-Butyl peroxide | 1.58 | |
| D | Styrene monomer | 262.7 | |
| D | Di-t-Butyl peroxide | 15.76 | |
| E | Ammonia Hydroxide 19% | 62.7 | |
| E | Deionized water | 640.3 | |
| F | Deionized water | 184.7 | |
| F | Ammonia Hydroxide 19% | 13.5 | |
| G | Deionized water | 169.6 | |
| | TOTAL YIELD (LBS): | 1669.6 | |

The Procedure for reacting the above raw materials was as follows.
1. Charge group A to a clean reactor.
2. Nitrogen sparge at the rate of 3scfh for 5 minutes at agitation of 200 rpm.
3. Begin heating to about 390 to 394° F., hold for 30 minutes, and cool to 302° F.

4. Charge group B to reactor while maintaining heat at 300 to 304° F., then heat to about 435 to 429° F. and hold for 1 hour, then cool to about 300° F.
5. Add group C and begin feeding group D over 2.5 hours at batch temperature of 298° F., and hold for about 2 hours after addition is completed until resin viscosity reaches about 128 poise, then cool to 192° F.
6. The resin was dropped into a heated premix of group E at 150 to 155° F., hold for 30 minutes at 182° F.
7. Feed in group F over 45 minutes.
8. Feed in group G over 45 minutes, then hold at 162° F. for one hour.
9. Cool below 126° F. and filter through 75 micron filter.

The physical properties of the resins are listed in following Table 2.

| TEST | SPECIFICATION |
|---|---|
| Wt. per gallon | 8.4 |
| Percent N.V. | 39 |
| pH | 9.1 |
| Viscosity Bkfld | 5300 cps |
| Viscosity C&P | 150 Ps |
| Free monomer | <0.5% on polymer solids |

EXAMPLE 3

30 gallons of a pigmented paint was made from the maleinized soya oil copolymer emulsion from Example 2 as follows.

| Soya Primer 100 gallon formula | |
|---|---|
| a.) Grind | |
| Deionized water | 94.0 lbs |
| A hydrophobically modified, hydroxyethyl cellulose thickener | 1.00 |
| In-can Preservative | 1.99 |
| Pigment Dispersant | 6.58 |
| Defoamer | 1.00 |
| Nonionic surfactant | 1.99 |
| In the above mix, disperse under high shear | |
| Calcined Kaolin | 77.78 |
| Deionized water | 23.63 |
| Titanium Dioxide, rutile | 100.96 |
| Deionized water | 30.00 |
| b.) Letdown | |
| Deionized water | 393.67 |
| Hydrophobically modified alkali swellable thickener | 9.50 |
| Ammonium hydroxide (19%) | 2.77 |
| Defoamer | 0.50 |
| Soya resin emulsion from Example 2 | 219.52 |
| Add Grind (a) from above | |
| Paint properties | |
| pH | 8.9 |
| Stormer viscosity | 103 KU |
| ICI Cone & Plate visc. | 0.8 Ps |
| Air dried paint films (>24 hrs) were as follows. | |
| Film properties | |
| Contrast Ratio | 94.9 |
| Shim scrub resistance | 89–103 scrubs |

EXAMPLE 4

1) Heat 300 g soya oil (alkali treated) to 200° C. with heavy nitrogen sparge, hold 1 hour, and then cool to 70° C. Switch nitrogen to blanket. Add 100 g maleic anhydride, and heat gradually (over 1 hour) to 225° C. Hold 1.5 hours and cool to 120° C. Add mixture of 100 g styrene and 2.0 g benzoyl peroxide over 2 hours. Hold ½ hour and cool to 85° C. Add 60 g isopropanol (dry), and allow temperature to rise under reflux to about 110° C. over an hour. Cool.

2) Warm 150 g of 1) to 80° C. and invert by adding a solution of 15.5 g ammonia (28%) in 200 g water over 10 minutes. Add 172 g water, then add 117 g styrene over 1 hour while simultaneously pumping in 1.0 g ammonium persulfate in 10 g water. Add 2.0 g t-butyl peroctoate and 74 g water, and hold 3 hours at 90° C. Cool.

Film Properties: Prepare a film by drawing 2) down over a black vinyl chart with a 3 mil draw down bar. The dry film is clear, haze free, and very glossy. After I week a water drop left no blush or mark after 10 minutes exposure.

EXAMPLE 5

Conventional latex paints typically require the use of hydrophobically modified, alkali-swellable hydroxyethyl cellulose, polyurethane thickeners, and/or acrylic thickeners to obtain proper viscosity to achieve good application properties and desired in-can viscosity. This may require an appropriate blend of several thickeners. The thickeners used tend to add significant cost to the formula. An advantage for the Soya primer of this invention has been that the coatings formulated have unexpectedly good viscosity response with thickeners at surprisingly low levels of thickeners. This improved thickener efficiency observed with Soya copolymer latex has allowed formulation of a paint with cost significantly below a comparable paint based on latex binders.

The following Table 3 records the results for a series of paints made to determine appropriate level of each of the thickener types to achieve a paint viscosity of 90–95 KU. All paint samples contained 2 pounds per 100 hundred gallons of a hydrophobically modified hydroxy cellulose thickener. The preferred acrylic thickener gave the most effective and most consistent thickening response as well as best oven aged thickening performance. The commercial product tested was a conventional PVA latex primer which required about 7 lbs/100 gallons of a hydrophobically modified, alkali-swellable hydroxethyl cellulose. The Soya copolymer of the invention requires the lowest level of preferred acrylic thickener to obtain the level of viscosity and thickness required.

TABLE 3

| | Acrylic thickener solids | Poly-urethane thickener solids | Poly-urethane thickener solids | Hydrophobically Modified hydroxyethyl cellulose thickener solids |
|---|---|---|---|---|
| Amount required for 100 gal Soya based coating to achieve paint viscosity of 92–95 KU | 3.2 lbs | 8.4 lbs | 2.5 to 5.5 lbs | 4.4 lbs |

EXAMPLE 6

A solvent-free waterborne primer based on the maleinized oil copolymer of this invention based on the copolymer of Example 1 exhibits superior dry and wet adhesion to aged gloss alkyd as a substrate, as compared to a conventional later primer. Pigmented primers were made as follows.

|  | PVA Primer | Soya Primer |
|---|---|---|
| Water | 495.8 | 438.8 |
| Hydrophobically modified, hydroxyethyl cellulose thickener | 8.4 | 0.50 |
| In-can preservative | 1.5 | 1.5 |
| Defoamer | 6.0 | 0.10 |
| Pigment dispersant | 4.0 | 4.9 |
| Nonionic surfactant | 4.0 | 2.0 |
| Talc | 50.0 | 49.1 |
| $TiO_2$ | 98.0 | 96.2 |
| Calcium Carbonate | 150.0 | 147.2 |
| Antisettling Agent | 2.5 | 6.9 |
| Ethylene glycol | 10.0 | 0.0 |
| PVA latex 56% NV | 208.0 | 0.0 |
| Soya emulsion (41% NV) from Ex. 2 | 0.0 | 283.1 |
| Texanol | 6.0 | 0.0 |
| HEUR thickener | 0.0 | 8.2 |
| Volume solids | 26.0 | 26.0 |
| PVC | 45.9 | 45.9 |

Leneta scrub panels were coated with gloss alkyd paint and allowed to dry for at least two weeks. Over this coating we applied both the standard latex primer and the soya version, using a 3-mil Bird applicator. The coatings were allowed to dry for three days. In one case the dry adhesion was tested by making a crosshatch cutting through the prime coat down to the alkyd on each coating. Permacel tape was applied over the crosshatch and rubbed hard to assure good adhesion. When the tape was pulled away sharply, nearly all the standard primer was removed. When the same thing was done to the soya version, only a little paint around the edges of the cuts was removed.

In the second case, identical panels were soaked for 15 minutes with a wet paper towel to fully saturate the coated film. Following this, a vertical scribe was made through the coating, and the films (side-by-side) were put on the Gardner scrub machine to test for delamination between the primer and the alkyd basecoat. In the case of the latex primer the entire film was removed with the first sweep of the scrub brush. In the case of the soya version of the same paint, no paint was removed after 350 cycles, which is the extent of the test.

EXAMPLE 7

An exterior Maleated Oil Latex

A maleinized soya oil was prepared by heating soya oil (200 gms) with triphenyl phosphite (1.0 gm) to 200° C. under nitrogen and holding 1 hour, followed by addition of maleic anhydride (32 gms) at 150° C. and then heating to 212° C. over 30 minutes and then holding at 225° C. for 1.5 hours.

The maleinized soya oil was then copolymerized with a mixture of styrene (84 gms), methyl methacrylate (84 gms), and di-tert-butyl peroxide (13.4 gms). The mixture was added over 2 hours at 160° C. and held for 1 hour.

The copolymer was then emulsified by adding deionized water (50 gms) at 95° C., holding 30 minutes, and then adding deionized water (200 gms) and ammonium hydroxide, 28% (40 gms) to obtain the emulsion. The copolymer was used as a polymeric binder to prepare an exterior architectural paint.

EXAMPLE 8

This example indicates how oil was incorporated into higher molecular weight copolymer. In order to monitor oil incorporation in the copolymer produced, an analytical technique was used to determine the degree of oil/styrene copolymerization as a function of molecular weight. An LC transform collection was done on a sample, whereby the eluant from the GPC column set was deposited onto a rotating reflective disc. The THF mobile phase was flashed off during deposition, leaving a deposited "sample track" of polymer solids. The disc was then analyzed by FT-IR to generate compositional information over the molecular weight distribution. The absorbances attributed to the soya oil, along with polystyrene, throughout the copolymer molecular weight distribution, even in the highest molecular weight region.

EXAMPLE 9

This is an negative example at 2% DtBP on styrene copolymer.

A copolymer was prepared as in Example 1, with the exception that the di-tert-butyl peroxide level was at a low level of 2% based on the Styrene weight. The resulting copolymer had a weight average molecular weight of 13,500 and the unpolymerized oil/maleinized oil was 23%. The free monomer level was 2.6% on copolymer. All three of these results were unacceptable for a decorative paint product.

What is claimed is:

1. An ambient dry coating composition substantially free of volatile organic coalescing solvents, the coating composition having a polymeric binder of a copolymer of a copolymerized maleinized fatty acid glyceride and ethylenically unsaturated monomer, wherein the copolymer is overpolymerized with ethylenically unsaturated monomer and free unpolymerized fatty acid glyceride does not exceed 20 percent of the copolymerized maleinized fatty acid glyceride and the copolymer comprising on a weight basis, between 40% and 50% copolymerized non-conjugated, unsaturated fatty acid glyceride, between 40% and 55% copolymerized ethylenic monomer comprising styrene, and between 3% and 12% copolymerized maleic anhydride, where the copolymer is produced by the process of (a) reacting the maleic anhydride with the fatty acid glyceride at temperatures above abut 140° C. to form a maleinized fatty acid glyceride having a pendent maleic anhydride structure, (b) in situ copolymerizing the ethylenic monomers with the maleinized fatty acid glyceride, in the absence of water and volatile organic solvent, at temperatures between about 80° C. and 200° C., and in the presence of at least 4% peroxide initiator based on the weight of monomer copolymerized, to form a styrenated, maleinized fatty acid glyceride copolymer having anhydride groups, (c) reacting the anhydride groups with water or a low alkyl alcohol to form a carboxyl functional copolymer, (d) neutralizing the carboxyl functional copolymer with amine or ammonia to form a neutralized copolymer, and (e) dispersing the neutralized copolymer into water to form an aqueous dispersed copolymer.

2. The coating composition of claim 1 where the copolymerized ethylenic monomers comprise by weight between 50% and 100% styrene.

3. The coating composition of claim 1 comprising between 42% and 48% copolymerized fatty acid glyceride, between 42% and 52% copolymerized ethylenic monomer, and between 6% and 10% copolymerized maleic anhydride.

4. The coating composition of claim 1 where the fatty acid glyceride is a triglyceride vegetable oil comprising linoleic fatty acid chains.

5. The coating composition of claim 2 where the fatty acid glyceride is a vegetable oil comprising linolenic fatty acid chains.

6. The coating composition in claim 2 where the glyceride is a triglyceride vegetable oil comprising linoleic and linolenic fatty chains.

7. The coating composition of claim 5 where the triglyceride vegetable oil comprises soybean oil.

8. The coating composition in claim 2 where the maleic anhydride and triglyceride are coreated at temperatures between 150° and 275°.

9. An ambient dry coating composition substantially free of volatile organic coalescing solvents, the coating composition having a polymeric binder of a copolymer of a copolymerized maleinized fatty acid glyceride and ethylenically unsaturated monomer, wherein the copolymer is overpolymerized with ethylenically unsaturated monomer and free unpolymerized fatty acid glyceride does not exceed 20 percent of the copolymerized maleinized fatty acid glyceride and the copolymer comprising on a weight basis, between 40% and 50% copolymerized non-conjugated, unsaturated fatty acid glyceride, between 40% and 55% copolymerized ethylenic monomer comprising styrene, and between 3% and 12% copolymerized maleic anhydride, where the copolymer is produced by the process of
  (a) reacting the maleic anhydride with the fatty acid glyceride at temperatures above about 140° C. to form a maleinized fatty acid glyceride having a pendent maleic anhydride structure,
  (b) in situ copolymerizing the ethylenic monomers with the maleinized fatty acid glyceride, in the absence of water and volatile organic solvent, at temperatures between about 80° C. and 200° C., and in the presence of a peroxide initiator, the peroxide initiator at a level above the molar peroxide equivalent of 4% by weight di-tertiary butyl peroxide based on the weight of monomer copolymerized, to form a styrenated, maleinized fatty acid glyceride copolymer having anhydride groups,
  (c) reacting the anhydride groups with water or a low alkyl alcohol to form a carboxyl functional copolymer,
  (d) neutralizing the carboxyl functional copolymer with amine or ammonia to form a neutralized copolymer, and
  (e) dispersing the neutralized copolymer into water to form an aqueous dispersed copolymer.

\* \* \* \* \*